(12) United States Patent  (10) Patent No.: US 6,384,809 B1
Smith  (45) Date of Patent: May 7, 2002

(54) PROJECTION SYSTEM (75) Inventor: Ronald D. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/258,051

(22) Filed: Feb. 26, 1999

(51) Int. Cl.[7] .............................................. G09G 3/36
(52) U.S. Cl. ......................... 345/101; 345/87; 361/687
(58) Field of Search .......................... 345/87, 101, 207; 361/687

(56) References Cited

U.S. PATENT DOCUMENTS

| | | | | |
|---|---|---|---|---|
| 5,255,109 A | * | 10/1993 | Klein | 359/43 |
| 5,313,362 A | * | 5/1994 | Hatada et al. | 361/709 |
| 5,500,054 A | * | 3/1996 | Goldstein | 136/253 |
| 5,598,320 A | * | 1/1997 | Toedtman et al. | 361/687 |
| 5,606,341 A | * | 2/1997 | Aguilera | 345/87 |
| 6,072,459 A | * | 6/2000 | Asakawa et al. | 345/101 |
| 6,121,950 A | * | 9/2000 | Zavracky et al. | 345/101 |
| 6,188,571 B1 | * | 2/2001 | Roganti et al. | 361/685 |
| 6,125,006 A1 | * | 7/2001 | Yamamoto et al. | 345/101 |
| 6,275,945 B1 | * | 8/2001 | Tsuji et al. | 713/300 |
| 6,288,896 B1 | * | 9/2001 | Hsu | 361/687 |

* cited by examiner

Primary Examiner—Richard Hjerpe
Assistant Examiner—Kimnhung Nguyen
(74) Attorney, Agent, or Firm—Trop, Pruner & Hu, P.C.

(57) ABSTRACT

A projection system includes a light source, a display panel, a temperature gradient panel and a controller. The light source is adapted to generate a first beam of light, and the display panel is adapted to modulate at least a portion of the first beam of light to form an associated modulated beam of light. The temperature gradient panel is thermally coupled to the display panel, and the controller is electrically coupled to the temperature gradient panel and the display panel. The controller is adapted to control the temperature gradient panel to regulate a temperature of the display panel.

30 Claims, 6 Drawing Sheets

PROJECTION SYSTEM

BACKGROUND

The invention relates to a projection system, such as a liquid crystal display (LCD) projection system, for example.

Figure 1:
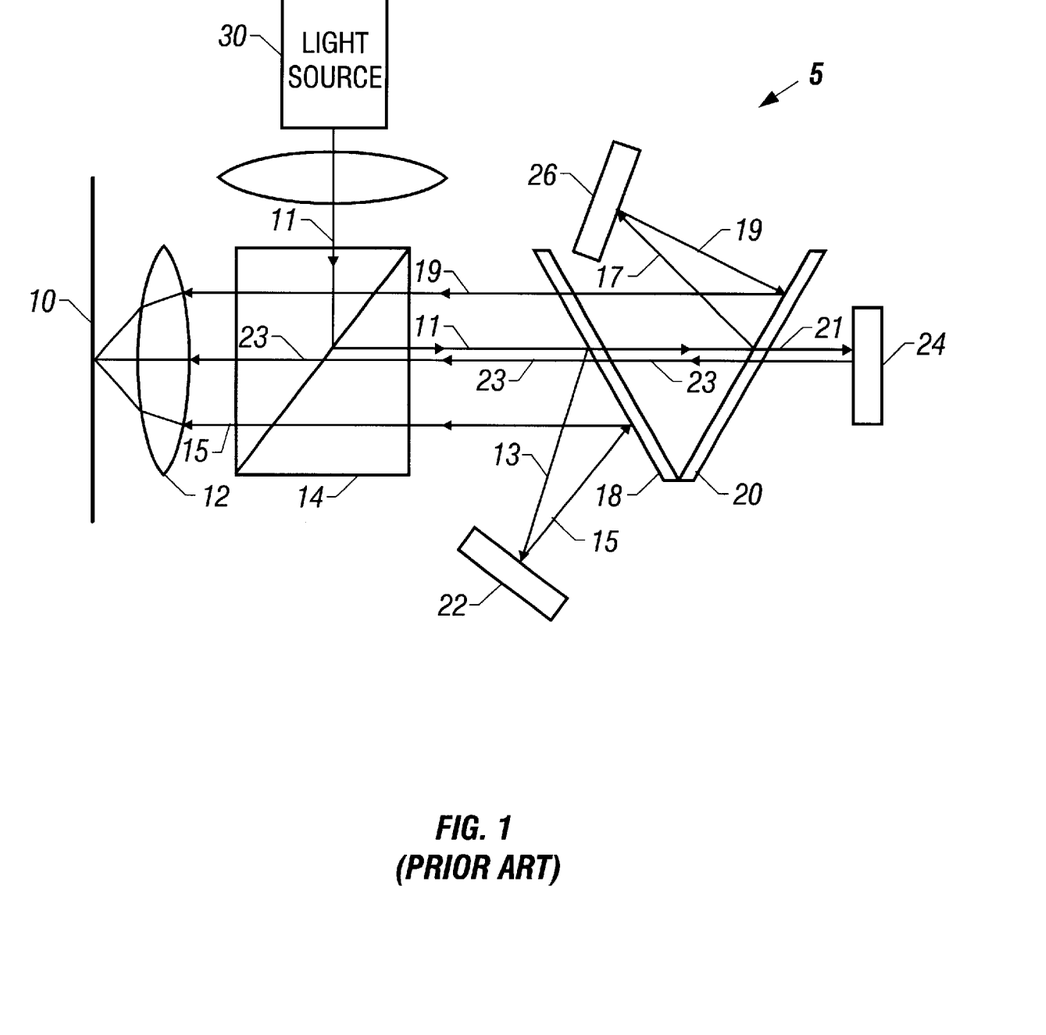
FIG. 1 is a schematic diagram of a LCD projection system of the prior art.

Referring to FIG. 1, a reflective liquid crystal display (LCD) projection system 5 typically includes an LCD display panel (LCD display panels 22, 24 and 26, as examples) for each primary color that is projected onto a screen 10. In this manner, for a red-green-blue (RGB) color space, the projection system 5 may include an LCD display panel 22 that is associated with the red color band, an LCD display panel 24 that is associated with the green color band and an LCD display panel 26 that is associated with the blue color band. Each of the LCD panels 22, 24 and 26 modulates light from a light source 30 to form red, green and blue images, respectively, that add together to form a composite color image on the screen 10. To accomplish this, each LCD display panel 22, 24 or 26 receives electrical signals that indicate the corresponding modulated beam image to be formed.

More particularly, the projection system 5 may include a beam splitter 14 that directs a substantially collimated white beam 11 of light (provided by the light source 30) to optics that separate the white beam 11 into red 13, blue 17 and green 21 beams. In this manner, the white beam 11 may be directed to a red dichroic mirror 18 that reflects the red beam 13 toward the LCD panel 22 that, in turn, modulates the red beam 13. The blue beam 17 passes through the red dichroic mirror 18 to a blue dichroic mirror 20 that reflects the blue beam 17 toward the LCD display panel 26 for modulation. The green beam 21 passes through the red 18 and blue 20 dichroic mirrors for modulation by the LCD display panel 24.

For reflective LCD display panels, each LCD display panel 22, 26 and 24 modulates the incident beams, and reflects the modulated beams 15, 19 and 23, respectively, so that the modulated beams 15, 19 and 23 return along the paths described above to the beam splitter 14. The beam splitter 14, in turn, directs the modulated beams 15, 19 and 23 through projection optics, such as a lens 12, to form modulated beam images that ideally overlap and combine to form the composite image on the screen 10.

The optical performance of the LCD display panel 22, 24 or 26 may be a function of the temperature of the display panel 22, 24 or 26, and the temperature of the display panel 22, 24 or 26 may rise during operation due to the heating caused by the illumination of the display panels 22, 24 and 26. Thus, the optical performance of the display panels 22, 24 and 26 may also vary during operation. To compensate for thermal drift, the projection system 5 may have a user "contrast" control to adjust the timing of voltages that are applied to the display panels 22, 24 and 26 to form the modulated beam images. However, the temperature of each display panel 22, 24 or 26 may be too high for the timing adjustment to adequately compensate the display panels 22, 24 and 26.

An alternative way to adjust for thermal drift is to apply correcting voltages to drive circuits that form the images on the display panels 22, 24 and 26 in response to a user control. However, unfortunately, this approach may also be ineffective once the temperature of the display panel exceeds an optimal range of temperatures.

Another way to compensate for thermal drift is to lower the temperatures inside the projection system 5, by for example, reducing the heat that is associated with the light beams that illuminate the display panels 22, 24 and 26. However, unfortunately, such techniques may impede the performance of the projection system 5. For example, a dichroic infrared (IR) filter may be used to filter infrared light, a source of heat, from the white beam 11 so that the amount of heat that reaches the display panels 22, 24 and 26 is reduced. However, a dichroic IR filter may have bandstop characteristics which are a function of an angle of incidence of the beam 11, and as a result, the imaging of the beam from the light source 30 may need to be very precise, a condition that may increase the cost of the projection system 5. Furthermore, increasing the accuracy of the imaging of the light source 30 may increase the imaging of defects in the light source 30 itself. Also, to remove enough heat, the IR dichroic filter may have a high bandstop frequency and thus, remove a deep red band of colors from the beam 11. Unfortunately, the removal of the deep red band of colors may degrade the color reproduction accuracy of the system 5.

Thus, there is a continuing need to address one or more of the problems stated above.

SUMMARY

In one embodiment of the invention, a projection system includes a light source, a display panel, a temperature gradient panel and a controller. The light source is adapted to generate a first beam of light, and the display panel is adapted to modulate at least a portion of the first beam of light to form an associated modulated beam of light. The temperature gradient panel is thermally coupled to the display panel, and the controller is electrically coupled to the temperature panel and the display panel. The controller is adapted to control the temperature gradient panel to regulate a temperature of the display panel.

In another embodiment, a computer system includes a processor, a display panel, a temperature gradient panel and a controller. The processor is adapted to furnish a first indication of an image. The display panel is adapted to modulate at least a portion of the first beam of light to form an associated modulated beam of light in response to the first indication of the image. The temperature gradient panel is thermally coupled to the display panel, and the controller is electrically coupled to the temperature gradient panel and the display panel. The controller is adapted to control the temperature gradient panel to regulate a temperature of the display panel.

In yet another embodiment, a method includes generating a first beam of light and modulating at least a portion of the first beam of light with a display panel to form an associated modulated beam of light. A temperature gradient is established near the display panel, and the temperature gradient is regulated to control the temperature of the display panel.

DETAILED DESCRIPTION

Figure 2:
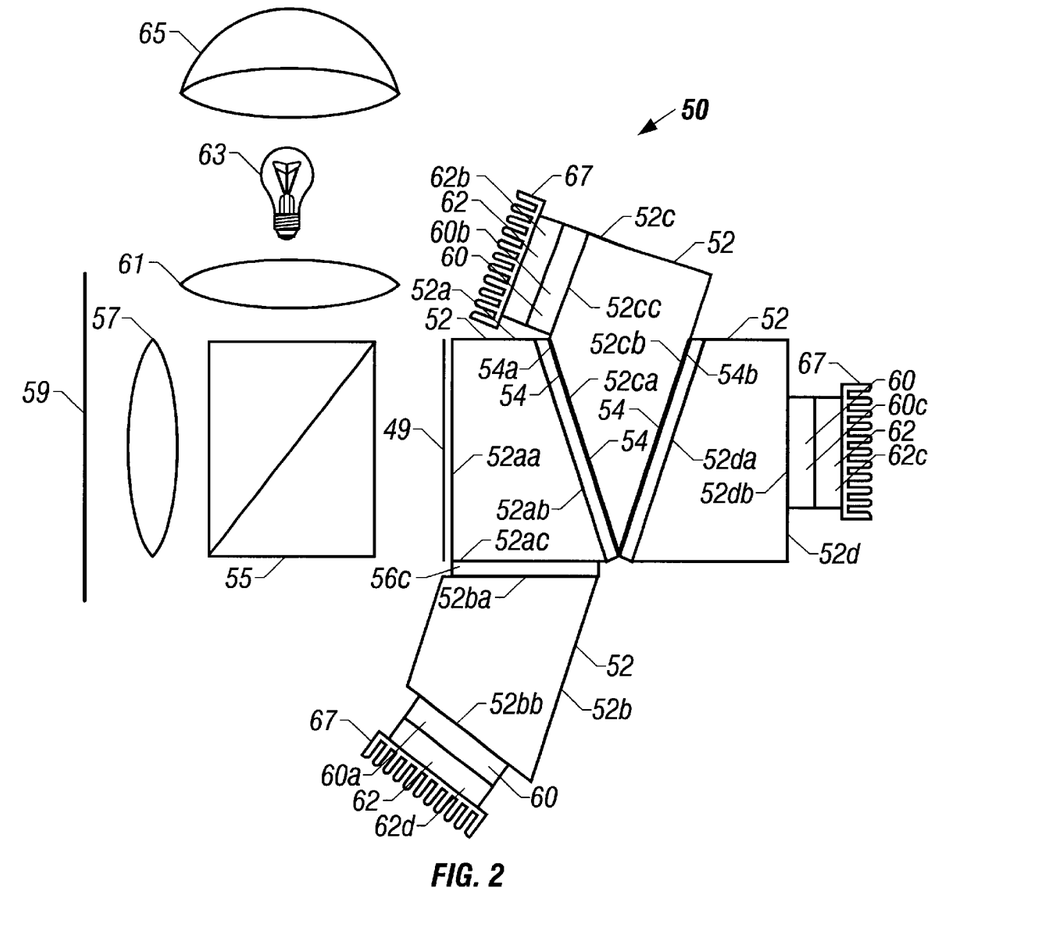
FIG. 2 is a schematic diagram of a projection system according to an embodiment of the invention.

Referring to FIG. 2, an embodiment 50 of a projection system in accordance with the invention includes display panels 60 (display panels 60a, 60b and 60c, as examples) that modulate beams (red, green and blue beams, for example) of light to generate a composite image on a display screen 59. In the course of operation, the heat generated by illumination of the display panels in a conventional projection system may affect the performance of the display panels. However, in contrast to conventional arrangements, the system 50 may include temperature gradient panels 62 (temperature gradient panels 62a, 62b and 62c, as examples), each of which is attached to an associated display panel 60 to regulate a temperature of the display panel 60. Due to this arrangement, a dichroic infrared (IR) filter with a high bandstop frequency may or may not be used to remove heat from the light that illuminates the display panels 60.

Thus, the advantages of the system 50 may include one or more of the following: performance of the system may be enhanced; the temperature of each display panel may stay within an optimal range of temperatures; heat generated by the light source may be compensated without the use of an IR filter that has a high bandstop frequency; the color reproduction accuracy may be enhanced; costs that are associated with imaging the light source may be reduced; and color compensation may be simplified.

In some embodiments, the projection system 50 may be a reflective liquid crystal display (LCD) projection system, and the display panels 60 may be reflective LCD display panels. In this manner, in some embodiments, each temperature gradient panel 62 may be attached to a face (an opaque face, for example) of an associated display panel 60 that is not involved in the modulation of light.

The temperature gradient panel 62 may be, for example, a thermoelectric device, such as a semiconductor device or an array of semiconductor devices that establish a temperature gradient using the Peltier effect. In this manner, as an example, the temperature gradient panel 62 may introduce a temperature gradient between a face (having a lower temperature) of the panel 62 that is mounted to the display panel 60 and the opposite face (having a higher temperature) of the panel 62. The magnitude of the temperature gradient (and thus, the temperature of the display panel 60) may be electrically controlled in a manner that regulates the temperature of the display panel 60, as described below.

Each temperature gradient panel 62 may be used to either cool or heat the associated display panel 60 to ensure that display panel 60 operates near or in its optimal temperature range. For example, the display panel 60 may reach optimal operating conditions near 50° Celsius (C.) (for example), a temperature that may not otherwise be reached without the temperature gradient panel 62 heating the associated display panel 60. Conversely, the display panel 60 may reach optimal operating conditions near lower temperatures that may not otherwise be reached without the temperature gradient panel 62 cooling the associated display panel 60.

In some embodiments, one or more heat sinks 67 may be thermally mounted to one or more of the display panels 62. The heat sink(s) 67 may be forced air cooled by one or more fans (not shown).

Figure 3:
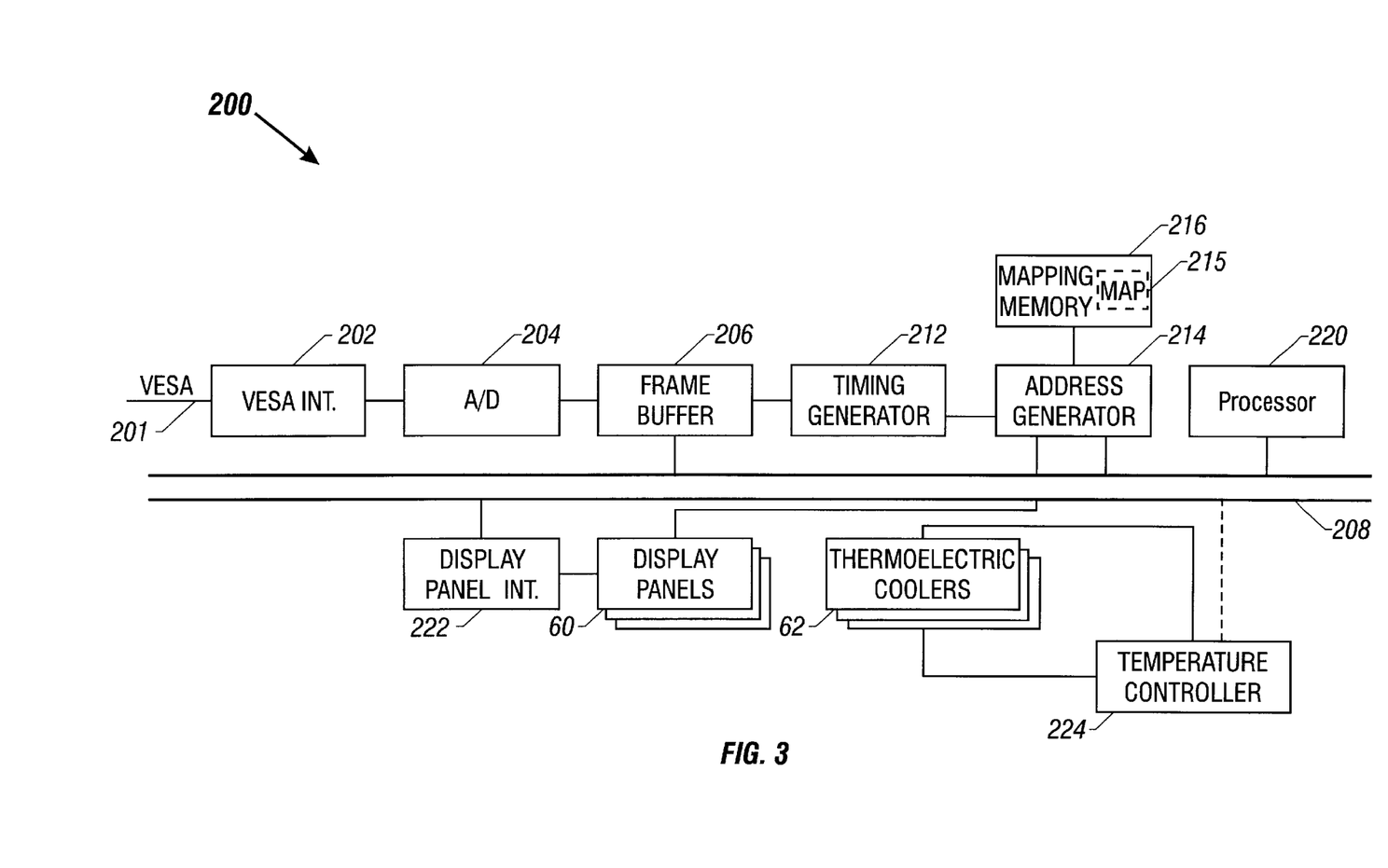
FIG. 3 is an electrical schematic diagram of the projection system of FIG. 2 according to an embodiment of the invention.

FIG. 3 depicts an electrical system 200 of the projection system 50. In particular, the temperature gradients that are introduced by the temperature gradient panels 62 may be controlled by a temperature controller 224 of the system 200. The temperature controller 224 senses the temperature of the display panels 62 and based on the sensed temperatures, controls the temperature gradient panels 62 to independently regulate the temperature of the display panels 62. Depending on the particular embodiment, the temperature controller 224 may operate under the explicit control of a processor (a microcontroller or microprocessor, as examples), such as the processor 220, that is separate from the temperature controller 224; the temperature controller 224 may be more loosely controlled by a processor that is separate from the temperature controller 224; or the temperature controller 224 may include a processor to aid in performing the controller's functions.

Figure 4:
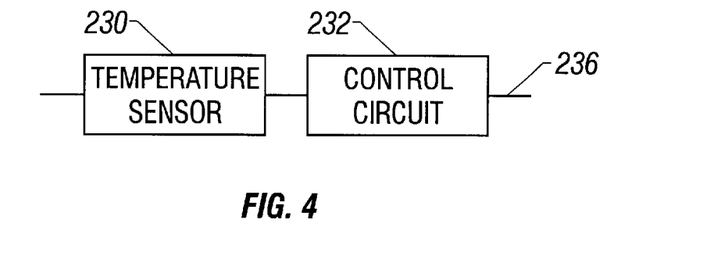
FIG. 4 is an illustration of a temperature controller of the system of FIG. 3 according to an embodiment of the invention.

Referring also to FIG. 4, the temperature controller 224 may include a temperature sensor 230 that in different embodiments, may be thermally or optically coupled (as examples) to the display panels 62 to sense the temperatures of the display panels 62, as described below. Based on the sensed temperatures, a control circuit 232 (that is coupled to the temperature sensor 230) generates control signals on conductive traces, or lines 236, that extend to the temperature gradient panels 62. The control signals, in turn, control the temperature gradients of the temperature gradient panels 62 to close a feedback loop for regulating the temperatures of the display panels 60. The control circuit 236, depending on the particular embodiment, may interact with the processor 220, may include a processor and/or may include hard-wired circuitry, as just a few examples.

Figure 5:
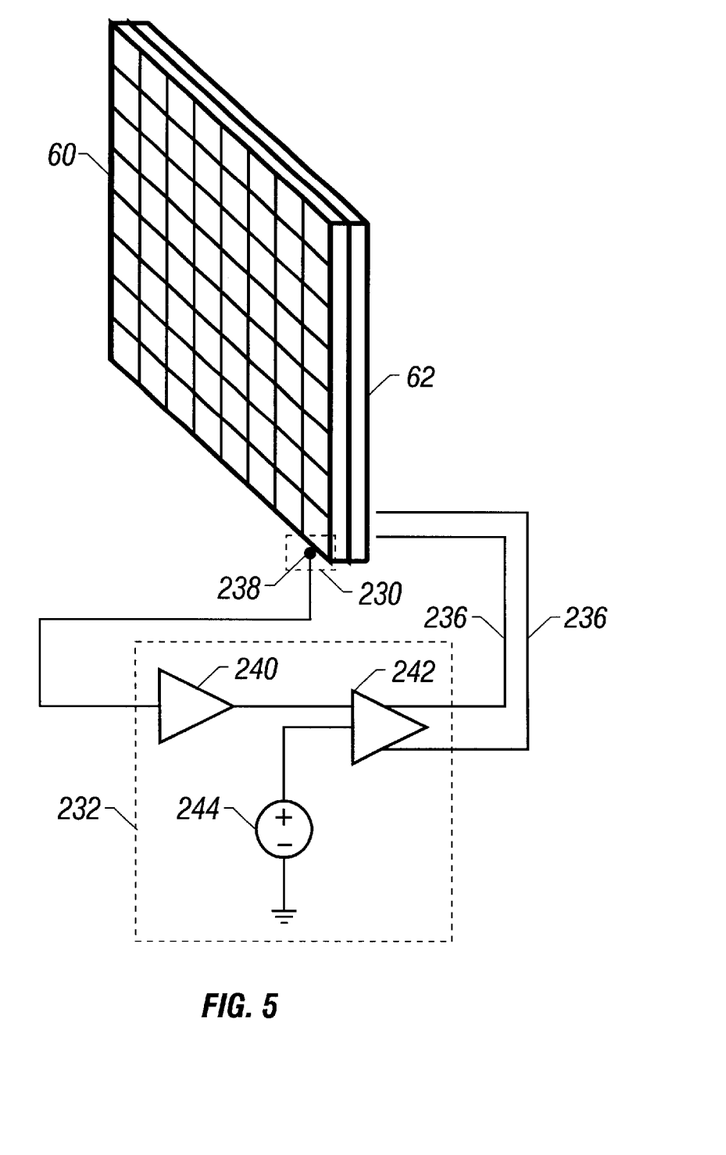
FIGS. 5, 6, 7 and 8 are more detailed schematic diagrams illustrating different arrangements used with the temperature controller according to different embodiments of the invention.

Referring to FIG. 5, in some embodiments, the temperature controller 224 may include the following circuitry for at least one of the display panels 60. In particular, the temperature sensor 230 may include at least one or more thermal sensors 238 (only one thermal sensor 238 is shown in FIG. 5) for each display panel 60. For each thermal sensor 238, the control circuit 232 may include a sensor buffer, or amplifier 240, that is coupled to the sensor 238 to furnish a sensor signal that indicates a temperature of the display panel 60. An error amplifier 242 (of the control circuit 232) produces a control signal (via the control lines 236) based on amplified comparison between the sensor signal and a threshold signal (provided by a voltage source 244, for example) that indicates a predetermined temperature for the display panel 60. The control signal, in turn, regulates the temperature gradient that is introduced by the temperature gradient panel 62.

In other embodiments, more than one thermal sensor 238 may be mounted to each temperature gradient panel 62 for purposes of obtaining an average temperature of the associated display panel 60. For these embodiments, the control circuit 232 may include a sensor amplifier 240 for each thermal sensor 238, and as an example, the sensor signals that are produced by these amplifiers may be summed together at a common input terminal node of the error amplifier 242. For these embodiments, the voltage of the voltage source 244 is adjusted to reflect the addition of multiple sensor signals.

Figure 6:
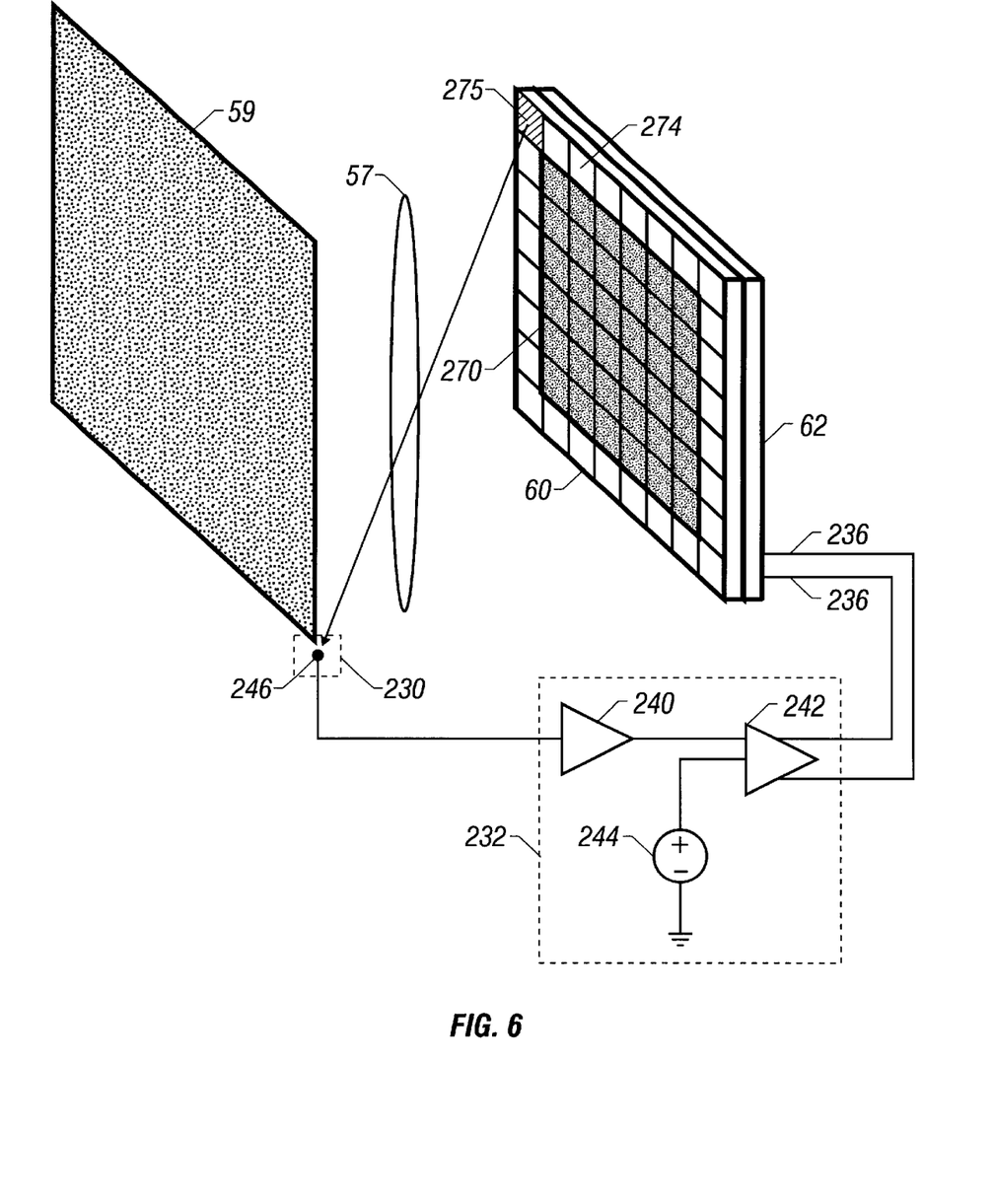

Referring to FIG. 6, in other embodiments, the temperature sensor 230 maybe an optical sensor 246 that is positioned to measure the intensity of light that is reflected by at least one pixel cell 275 of the display panel 60. In this manner, the pixel cell 275 may be driven by a nearly constant voltage level to generate an image that may be monitored to measure the temperature of the display panel 60. Because the optical performance of the pixel cell 275 varies with the temperature of the pixel cell 275, the intensity of light that is reflected by the pixel cell 275 indicates the temperature of the display panel 60.

In some embodiments, the pixel cell 275 may be a pixel cell of the display 60 that is not used for modulating the incident beam of light. In this manner, the pixel cell 275 may not be included in an active block 270 of pixel cells that are used to modulate the incident beam to form an image on the screen 59. Instead, optics 57 of the system 50 may direct the optical output of the pixel cell 275 to the optical sensor 246 that is positioned beside of the screen 59. As a result of this arrangement, the light reflected from the pixel cell 275 and the sensor 246 may be hidden inside the projection system 50 from a viewer of the projection system 50.

In some embodiments, each display panel 60 may be associated with an optical sensor 246. The optical sensor 246, in turn, may be coupled to circuitry similar to the control circuitry used by the thermal sensor 238. For example, for each display panel 60, the optical sensor 246 may be coupled to the sensor amplifier 240, the error amplifier 242 and the voltage source 244, that use the signal from the optical sensor 246 to regulate the temperature of the display panel 60, as described above for the thermal sensor 238.

Figure 7:
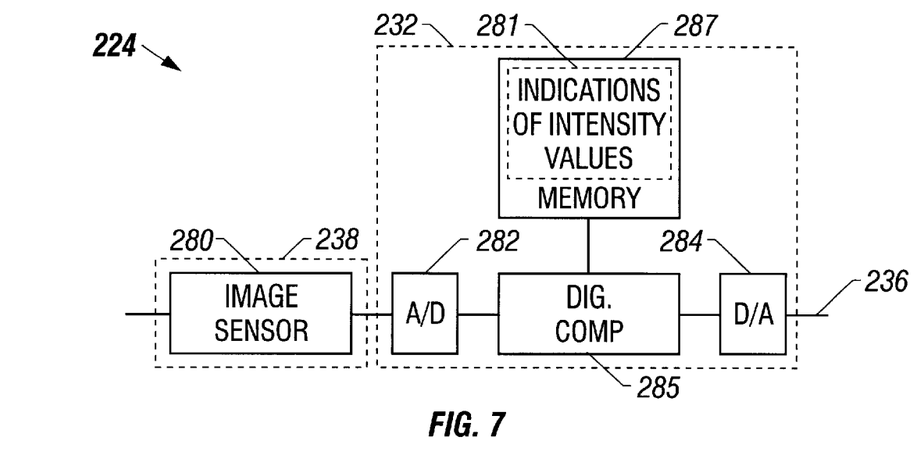

In other embodiments, for a particular display panel 60, one or more of the optical sensors 246 may be grouped together to form an image sensor 280, as depicted in FIG. 7. In this manner, several of the pixel cells 275 (see FIG. 6) may be coupled to near constant voltage potentials to form an image on the image sensor 280 that is located, for example, beside the screen 59. The image sensed by the image sensor 280, in turn, indicates the temperature of the display panel 60. Thus, the control circuit 232 may compare the image sensed by the image sensor 280 with a reference image and generate the control signals for the associated temperature gradient panel 62 accordingly.

To accomplish this, the control circuit 232 may include the following circuitry for each display panel 60. An analog-to-digital (A/D) converter 282 may receive analog signals (from the image sensor 280) that indicated the sensed image and provide digital signals that indicate the sensed image. A digital comparator 285 may compare the sensed image to a reference image. Depending on the particular embodiment, the comparator 285 may include a processor, or the comparator 285 may interact with the processor 220, for example, in the course of performing the comparator's functions. The comparator 285 may retrieve indications of reference intensities from a memory 287 and compare the reference intensities to the intensities sensed by the image sensor 280. The comparator 285 may furnish a digital signal that indicates the result of the comparison, and a digital-to-analog (D/A) converter 284 may convert the digital signal into a control signal that is provided to the lines 236.

Figure 8:
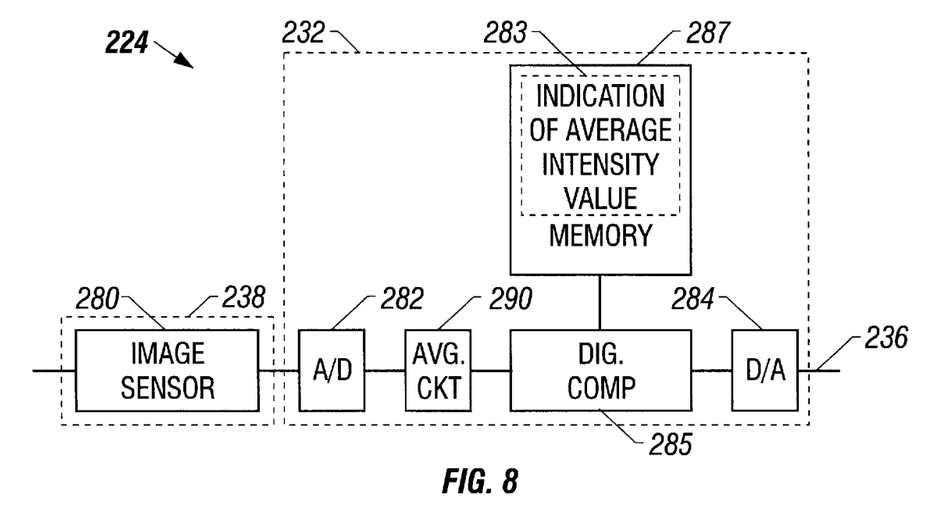

Referring to FIG. 8, in other embodiments, the control circuit 232 may include the circuitry described above and an averaging circuit 290 to average the indications of the sensed intensities that are provided by the A/D circuit 282. In this manner, for this embodiment, the comparator 285 may compared the average sensed intensity to a reference average intensity to produce the control signals. The comparator 285 may retrieve an indication 281 of the reference average intensity from the memory 287, for example.

In yet other embodiments, the image sensor 280 may be positioned on a region of the screen 59 on to which the composite image is formed. More particularly, pixel cells from the active block 270 of pixel cells (see FIG. 6) may be used to produce an image on the image sensor 280. This image may or may not be produced in conjunction with pixel cells 275 from other display panels 60. In some embodiments, periodically, a predetermined set of voltages may be applied to these pixel cells to generate a predetermined optical pattern on the image sensor 280. The comparator 287 may then compare the optical pattern to a predetermined reference image to generate the control signals, as described above.

Referring back to FIG. 3, a display panel interface 222 of the electrical system 200 generates the voltages that are applied to the pixel cells of the display panels 60. In some embodiments, the display panel interface 222 may generate the voltages based on data received from an address generator 214. However, the display panel interface 222, in some embodiments, may control the voltages of the pixel cell(s) 275 independently from the data received from the address generator 214. In some embodiments, the display panel interface 214 may periodically change the voltages of the pixels of the active block 270 to generate the test pattern independently from the data received from the address generator 214. However, in other embodiments, all pixel cell voltages may be controlled by the data received from the address generator 214.

As examples, the projection system 50 may be a computer system, a stand-alone projection system, or a display for a computer system. The term "computer system" may generally refer to a processor-based computer system such as a laptop computer, a hand-held computer, a desktop computer, a set-top box or an appliance, as just a few examples. The term "processor" may refer to one or more microcontroller(s) or microprocessor(s) (an X86 microprocessor, a Pentium® microprocessor or an Advanced Risc Machine (ARM) microprocessor, as examples), as just a few examples. Other types of computer systems, other types of processors are and other types of projection systems are possible; and thus, the described embodiments are not intended to limit the scope of the invention.

Besides the above-described circuitry, the electrical system 200 may include a Video Electronics Standards Association (VESA) interface 202 to receive analog signals from a VESA cable 201. The VESA standard is further described in the Computer Display Timing Specification, v.1, rev. 0.8 that is available on the Internet at www.vesa.org/standards.html. Other standards and/or interfaces may be used. The analog signals from the cable 201 indicate images to be formed on the display 59 and may be generated by a graphics card of a computer, for example. The analog signals are converted into digital signals by an analog-to-digital (A/D) converter 204, and the digital signals are stored in a frame buffer 206. A timing generator 212 may be coupled to the frame buffer 206 and regulate a frame rate at which images are formed on the screen 59. A processor 220 (one or more microcontrollers or one or more microprocessors, as examples) may be coupled to the frame buffer 206 via a bus 208.

The processor 220 may process the data stored in the frame buffer 206 to, as examples, transform the coordinate space used by the graphics card into the coordinate space used by the display panels 60, remap the color space used by the graphics card into the color space used by the display panels 60 and cause the data to conform to the gamma function of the display panels 60. The end product of these operations is a set of RGB values for each pixel of the image. In this manner, the R values are used to form the intensity values of the pixels of the display panel 60a, the G values are used to form the intensity values of the pixels of the display panel 60c and the B values are used to form the intensity values of the pixels of the display panel 60b. The address generator 214 may be coupled to a mapping memory 216 that stores a map 215 used to transfer image space coordinates into pixel locations on the display panels 60.

Depending on the particular embodiment, the temperature controller 224 may or may not be coupled to the bus 208.

Referring back to FIG. 2, in some embodiments, the projection system 50 may include prisms 52 (prisms 52a, 52b, 52c and 52d, as examples) that direct an incoming beam of white light (formed from red, green and blue beams) from the light source 63 to the display panels 60, as described below. In particular, the light from the light source 63 is collimated by a parabolic mirror 65 before passing through a condensing lens 61 to a beam splitter 55. The beam splitter 55 directs the white beam from the beam splitter 55, through a polarizer 49 and to the prism 52a that receives the incoming white beam of light at a prism face 52aa that is normal to the incoming light. The prism 52a directs the beam to a prism face 52ab that is inclined toward the face 52aa. The reflective face of a red dichroic mirror 54a may be mounted to the prism face 52ab or to the prism face 52ca.

The red dichroic mirror 54a separates the red beam from the incoming white beam by reflecting the red beam so that the red beam exits another prism face 52ac of the prism 52a and enters a prism face 52ba of the prism 52b. The prism faces 52ac and 52ba may be mounted together. The prism 52b, in turn, directs the red beam to the incident face of the display panel 60a that is mounted to another prism face 52bb of the prism 52b that is inclined toward the prism face 52ba. The display panel 60a modulates the incident red beam, and the modulated red beam follows a similar path to the path followed by the incident red beam. However, instead of being directed toward the light source 63, a beam splitter 55 directs the modulated red beam through the lens optics 57 to form an image of the modulated red beam on a screen 59.

The remaining blue and green beams (from the original incoming white beam) pass through the red dichroic mirror 54a. The opposite face of the mirror 54a is attached to a prism face 52ca of the prism 52c, an arrangement that causes the blue and green beams to pass through the red dichroic mirror 54a, pass through the prism face 52ca of the prism 52c, travel through the prism 52c and pass through a prism face 52cb (of the prism 52c) that forms an acute angle with the prism face 52ca. The reflective face of a blue dichroic mirror 54b is mounted to the prism face 52cb or to the prism face 52da. As a result, the blue dichroic mirror 54b reflects the blue beam back into the prism 52c to cause the blue beam to exit another prism face 52cc of the prism 52c. The incident face of the display panel 60b is mounted to the face 52cc and modulates the incident blue beam. The modulated blue beam, in turn, follows a path similar to the path followed by the incident blue beam. The beam splitter 55 directs the modulated blue beam through the projection optics 57 to form an image of the modulated blue beam on the screen 59.

The green beam passes through the blue dichroic mirror 54b and enters the prism 52d through a prism face 52da that may be mounted to the other face of the blue dichroic mirror 54b. The green incident beam exits another prism face 52db of the prism 52d to strike the incident face of the display panel 60c that is mounted to the prism face 52db. The display panel 60c modulates the incident green beam before reflecting the modulated green beam along a path similar to the path followed by the incident green beam. The beam splitter 55 directs the modulated green beam through the projection optics 57 to form an image of the modulated green beam on the screen 59. The three modulated beam images form a color composite image on the screen 59.

Other embodiments are within the scope of the following claims. For example, different topologies for the optical system and/or different topologies for the prisms may be used. As another example, in some embodiments, transmissive (instead of reflective) display panels may be used.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A projection system comprising:
   a light source adapted to generate a first beam of light;
   a display panel adapted to modulate at least a portion of the first beam of light to form an associated modulated beam of light;
   a temperature gradient panel thermally coupled to the display panel to cool the display panel; and
   a controller electrically coupled to the temperature gradient panel and the display panel, the controller adapted to control the temperature gradient panel to regulate a temperature of the display panel.

2. The projection system of claim 1, wherein the temperature gradient panel is mounted to the display panel.

3. The projection system of claim 1, wherein the temperature gradient panel comprises:
   a thermoelectric device adapted to use the Peltier effect.

4. The projection system of claim 1, wherein the display panel comprises:
   an LCD display panel.

5. The projection system of claim 1, wherein
   the temperature gradient panel establishes the temperature of the display panel in response to a control signal, and
   the controller comprises:
      a temperature sensor thermally coupled to the display panel and adapted to furnish a first indication of the temperature of the display panel; and
      an amplifier adapted to compare the first indication with a second indication of a reference temperature and regulate the control signal based on the comparison.

6. The projection system of claim 1, wherein
   the temperature gradient panel establishes the temperature of the display panel in response to a control signal, and
   the controller comprises:
      a sensor adapted to sense an optical performance of the display panel to obtain an indication of the temperature of the display panel and furnish a first indication of the temperature; and
      an amplifier adapted to compare the first indication with a second indication of a reference temperature and regulate the control signal based on the comparison.

7. The projection system of claim 6, wherein
   the sensor comprises an image sensor adapted to sense an image of the modulated beam of light.

8. The projection system of claim 7, further comprising:
   a circuit coupled to the display panel and the sensor, the circuit adapted to cause the modulated beam of light to form a test image and to cause the sensor to sense the modulated beam of light when the modulated beam of light indicates the test image.

9. The projection system of claim 6, wherein
   the display panel comprises a first set of pixels adapted to form a first image of the modulated beam of light and a second set of at least one pixel different from the first set of pixels, the second set adapted to form a test image, and the sensor comprises an image sensor adapted to sense the test image.

10. The projection system of claim 1, wherein the controller comprises:

a sensor adapted to sense an optical performance of the display panel; and a circuit adapted to control the temperature gradient panel based on the optical performance sensed by the sensor.

11. The projection system of claim 10, wherein the sensor is adapted to sense an intensity pattern of light reflected by the display panel, and the circuit is adapted to base the control of the temperature gradient panel on the sensed intensity pattern.

12. The projection system of claim 11, wherein the circuit is further adapted to:

average the intensity pattern, and base the control of the temperature gradient panel on the average.

13. The projection system of claim 1, wherein the temperature gradient panel is adapted to cool the display panel.

14. The projection system of claim 1, wherein the temperature gradient panel is adapted to heat the display panel.

15. A computer system comprising:

a processor adapted to furnish a first indication of an image;

a light source adapted to generate a first beam of light;

a display panel adapted to modulate at least a portion of the first beam of light to form an associated modulated beam of light in response to the first indication;

a temperature gradient panel thermally coupled to the display panel to cool the display panel; and a controller electrically coupled to the temperature gradient panel and the display panel, the controller adapted to control the temperature gradient panel to regulate a temperature of the display panel.

16. The computer system of claim 15, wherein the temperature gradient panel is mounted to the display panel.

17. The computer system of claim 15, wherein the temperature gradient panel comprises:

a thermoelectric device adapted to use the Peltier effect.

18. The computer system of claim 15, wherein the temperature gradient panel comprises:

an LCD display panel.

19. The computer system of claim 15, wherein the temperature gradient panel establishes the temperature of the display panel in response to a control signal, and the controller comprises:

a temperature sensor thermally coupled to the display panel and adapted to furnish a first indication of the temperature of the display panel; and an amplifier adapted to compare the first indication of the temperature with a second indication of a reference temperature and regulate the control signal based on the comparison.

20. The computer system of claim 15, wherein the temperature gradient panel establishes the temperature of the display panel in response to a control signal, and the controller comprises:

a sensor adapted to sense an optical performance of the display panel to obtain an indication of the temperature of the display panel and furnish a first indication of the temperature; and an amplifier adapted to compare the first indication of the temperature with a second indication of a reference temperature and regulate the control signal based on the comparison.

21. The computer system of claim 20, wherein the sensor comprises an image sensor adapted to sense an image of the modulated beam of light.

22. The computer system of claim 21, further comprising:

a circuit coupled to the display panel and the sensor, the circuit adapted to cause the modulated beam of light to form a test image and to cause the sensor to sense the modulated beam of light when the modulated beam of light indicates the test image.

23. The computer system of claim 20, wherein the display panel comprises a first set of pixels adapted to form a first image of the modulated beam of light and a second set of at least one pixel different from the first set of pixels, the second set adapted to form a test image, and the sensor comprises an image sensor adapted sense the test image.

24. The computer system of claim 15, wherein the controller comprises:

a sensor adapted to sense an optical performance of the display panel to obtain an indication of the temperature of the display panel; and a circuit adapted to control the temperature gradient panel based on the indication of the temperature.

25. The computer system of claim 24, wherein the sensor is adapted to sense and intensity pattern of light reflected by the display panel, and the circuit is adapted to base the control of the temperature gradient panel on the sensed intensity pattern.

26. The computer system of claim 25, wherein the circuit is further adapted to:

average the intensity pattern, and base the control of the temperature gradient panel on the average.

27. A method comprising:

generating a first beam of light;

modulating at least a portion of the first beam of light with a display panel to form a modulated beam of light;

establishing a temperature gradient near the display panel; and regulating the temperature gradient to cool the display panel to control a temperature of the display panel.

28. The method of claim 27, wherein the act of regulating comprises:

detecting an optical performance of the display panel, and wherein the act of regulating includes adjusting the temperature gradient based on the detection.

29. The method of claim 28, wherein the act of detecting the optical performance comprises:

sensing an image of the modulated beam of light.

30. The method of claim 27, wherein the act of regulating comprises:

thermally detecting a temperature of the display panel, and wherein the act of regulating includes adjusting the temperature gradient based on the detected temperature.

* * * * *